US005652688A

United States Patent [19]

Lee

[11] Patent Number: 5,652,688

[45] Date of Patent: Jul. 29, 1997

[54] HYBRID CIRCUIT USING MILLER EFFECT FOR PROTECTION OF ELECTRICAL CONTACTS FROM ARCING

[75] Inventor: Tony J. Lee, Pullman, Wash.

[73] Assignee: Schweitzer Engineering Laboratories, Inc., Pullman, Wash.

[21] Appl. No.: 527,185

[22] Filed: Sep. 12, 1995

[51] Int. Cl.[6] ................................ H02H 3/00; H01H 9/30

[52] U.S. Cl. ................................ 361/13; 361/2

[58] Field of Search ................................ 361/2, 3, 6, 10, 361/13, 7–8; 307/116, 134–137

[56] References Cited

U.S. PATENT DOCUMENTS

| | | | |
|---|---|---|---|
| 4,658,320 | 4/1987 | Hongel | 361/13 |
| 5,517,378 | 5/1996 | Asplund et al. | 361/4 |
| 5,536,980 | 7/1996 | Kawate et al. | 307/116 |

*Primary Examiner*—Jeffrey A. Gaffin
*Assistant Examiner*—Michael J. Sherry
*Attorney, Agent, or Firm*—Jensen & Puntigam, P.S.

[57] ABSTRACT

An IGBT semiconductor device is connected across switching contacts which are to be protected from arcing. When the contacts are in a normally open configuration, the gate portion of the IGBT is connected to the emitter portion through the contacts, while when the contacts are in a closed configuration, the collector portion of the IGBT is connected to the emitter portion through the contacts. A capacitor is connected in parallel with the gate-collector junction. The combination of the stray collector gate capacitance and the additional capacitor is sufficient to maintain the IGBT device in conduction as the contacts are moving from their closed configuration to their open configuration, thereby preventing arcing across the contacts.

4 Claims, 1 Drawing Sheet

HYBRID CIRCUIT USING MILLER EFFECT FOR PROTECTION OF ELECTRICAL CONTACTS FROM ARCING

TECHNICAL FIELD

This invention relates generally to arc suppression and/or extinction circuits for electrical contacts (contacts through which an electrical current flows) and more specifically concerns such a circuit which includes an insulated gate bipolar junction transistor (IGBT).

BACKGROUND OF THE INVENTION

With electrical contacts, whether in a high current circuit, or in the form of conventional relay output contacts or in other similar circuits, a common problem is the possible creation of an electrical arc between the contacts as they begin to open from a closed position. If the voltage across the opening contacts is allowed to rise to a sufficient level, an arc forms between the contacts. The voltage may even be sufficient that the arc will continue even after the contacts open and in an extreme case, the arc may continue even to maximum contact separation. Arcing is undesirable because of the wear it produces on the contacts as well as other circuit effects which may occur due to the arc current after the circuit should be open.

Typically, the manufacturers of devices such as relay contacts rate those contacts to switch a certain voltage and current reliably many thousands if not millions of times. To guarantee such a performance rating, the manufacturer typically relies on the inherent arc suppression and/or arc extinction characteristics of that particular contact arrangement. Characteristics which influence a contact's ability to suppress or extinguish an arc include the smoothness, size and shape of the contacts, the separation rate, the final maximum separation distance, and the characteristics of the medium separating the contacts in their open state.

These inherent arc suppression and/or extinction characteristics can be augmented by placing external components/circuitry across the contacts which hold the peak voltage or rate of increase of the voltage across the contacts to a value compatible with the separation rate or final maximum separation distance of the contacts. An example of such an external component is a capacitor. This technique is shown in U.S. Pat. No. 4,438,472 to Woodworth. Woodworth increases the effect of the shunting capacitor with a bipolar junction transistor.

Such a technique is not appropriate in many applications, however, including protective relays in a power substation. The capacitance may appear as a short circuit, even when the contacts are open. Further, for loads which are significantly less than the circuit is designed for, the time required for interrupting the load current is significantly extended.

Another approach involves the control of the peak voltage across the contacts without regard to their separation rate. The voltage is limited to a value in accordance with the rating of the contacts and the expected load current. This technique allows an arc to form but limits the peak voltage across the contacts such that the arc is extinguished by the natural characteristics of the particular contact arrangement. This technique, however, limits the operation of the contacts to rated performance which in many cases is impractical or otherwise unacceptable.

DISCLOSURE OF THE INVENTION

Accordingly, the invention is a circuit capable of suppression or extinction of arcing across switching contacts, wherein the circuit includes: an insulated gate bipolar junction transistor (IGBT), which comprises a Darlington combination of a field-effect transistor and a bipolar junction transistor connected across the contacts; and a capacitor, which is connected between a collector portion and a gate portion of the IGBT, adding to the stray capacitance of the IGBT, so that the combined capacitance is such that in response to a current therethrough, the resulting voltage across the combined capacitance produces a large enough charge at the gate portion of the IGBT to turn the IGBT on, which in turn limits the voltage across the capacitance to a value just sufficient to maintain the IGBT in conduction, and wherein the voltage across the IGBT is sufficiently limited to prevent arcing across the contacts.

BEST MODE FOR CARRYING OUT THE INVENTION

The arc suppression and extinction system of the present invention (hereinafter referred to simply as an arc suppression system) is designed to operate in conjunction with electrical and/or electromechanical contacts which carry a medium range of current, i.e. up to approximately 10 amps or so.

In one particular application for the present invention, the electrical contacts to be protected are present on the rear panel of, and form output contacts for, a microprocessor-based relay which is used for protecting electric power transmission/distribution systems. In this particular application, the closing of the electrical output contacts on the rear panel of the relay by the operation of the relay results in the closing of a circuit which includes a trip coil for a circuit breaker connected to an electric power line. The circuit breaker normally carries very high currents, on the order of 1000 amps. When the output contacts of the relay close, battery power as a result flows to the trip coil circuit, which in operation, opens the circuit breaker.

It should be understood, however, that the arc suppression circuit of the present invention can be used to protect electrical contacts in other applications involving medium current levels.

Figure 1:
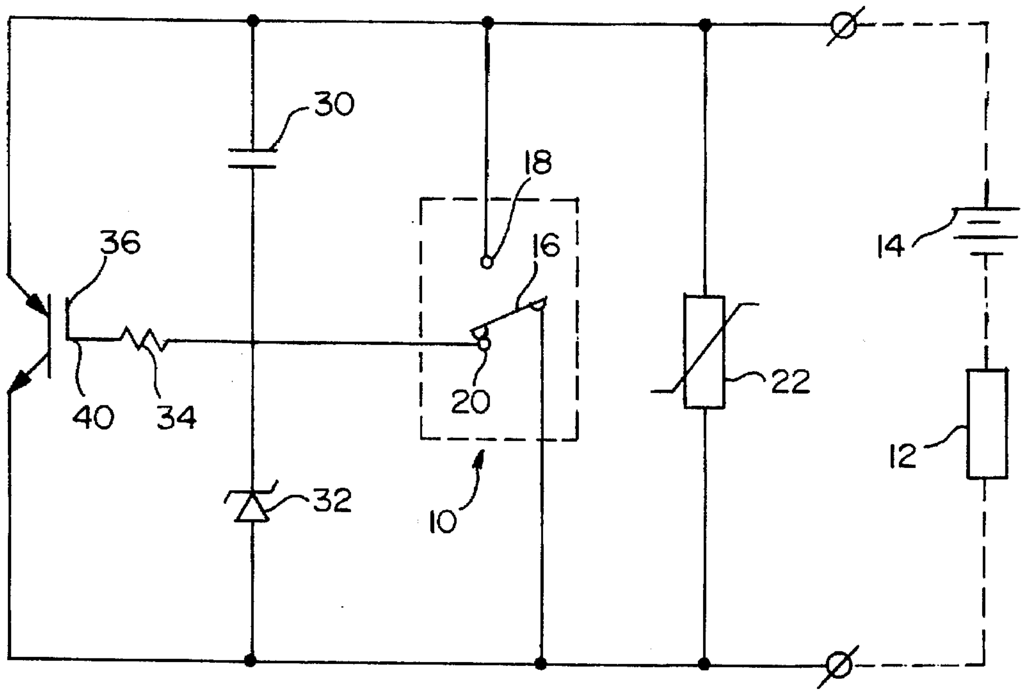
FIG. 1 is a circuit diagram showing the arc suppression and extinction circuit of the present invention relative to particular contacts being protected.

Referring now specifically to FIG. 1, the electrical contact circuit application referred to above (i.e. the microprocessor-based protective relay output contact circuit) is shown generally at 10. In one implementation, electrical contact circuit 10 is an electromechanical circuit known and available commercially as an Omron G6R-1, which has operating characteristics which are suitable for a microprocessor-based protective relay. Circuit 10 opens and closes a power system circuit which includes a circuit breaker trip coil, shown in FIG. 1 as load 12, and a power substation battery 14 which provides power to the load. In the embodiment shown, battery 14 is nominally 125 volts DC; however, the battery voltage may in fact go as high as 140 volts DC, due to battery charging current.

In the embodiment shown, the Omron G6R-1 circuit 10 includes a wiper arm 16 which moves between electrical output contacts 18 and 20. The movement of wiper arm 16 is controlled by current through a coil 21 which is shown in the Omron circuit in FIG. 2.

Wiper arm 16 is shown in FIG. 1 in what is referred to as an "open" position for the circuit 10, positioned against contact 20. In this embodiment, wiper arm 16 is normally in that open position. In this position of the wiper arm, no current will flow in the circuit because battery 14 is held off by the combination of the open position of the contact circuit 10, a metal oxide varistor (MOV) 22, and an insulated gate bipolar junction transistor (IGBT) 36. For the circuit shown, MOV 22 is rated at 130 volts RMS, which means that it definitely will not conduct up to 180 volts DC, i.e. MOV 22 will block current flow until the voltage across it exceeds approximately 180 volts DC. In operation, the voltage is clamped at 250–300 volts by MOV 22 for medium current levels.

The IGBT 36 is a key element in the present invention, as described in more detail below. An IGBT is an insulated gate bipolar junction transistor (IGBT), which is a Darlington-type combination of a field effect transistor (FET) and a bipolar junction transistor (BJT) capable of handling high levels of power.

In operation, the FET portion of the device supplies base drive to the BJT portion such that the device as a whole is controlled by the gate of the FET. The gate drive requirements for an IGBT are thus similar to those of an FET, while the power switching capability of an IGBT is much higher than for a similar size FET, since the voltage drop across the IGBT device is clamped at about one volt when properly driven. An IGBT device typically has higher leakage current than the FET portion thereof does, although the IGBT leakage current is in fact much less than what is permissible in the arc suppression circuit shown. In the present case, a suitable IGBT is an IRGPC40S manufactured by International Rectifier, which is capable of handling 60 amps and 600 volts.

In the particular protective relay configuration described above, wiper 16 is in an "open" position when the circuit breaker in the power system is closed and the current in the power transmission line is at a normal level.

When the microprocessor-based protective relay detects an event such as the current on the power transmission line being above a preselected threshold, a signal is applied to the base of transistor 26 in the Omron output contact circuit, through resistor 27 and zener diode 28. This results in a current through coil 21, which causes wiper arm 16 to begin to move from contact 20 to contact 18, in effect moving from an "open" position to a "closed" position. This results in battery 14 producing a current through electrical output contact circuit 10, including wiper arm 16, and then back to the trip coil load 12, thus energizing the coil and resulting in an opening of the circuit breaker for the power transmission line carrying the out-of-tolerance current.

Referring now more specifically to FIG. 1, capacitor 30, diode 32, and the natural gate-to-emitter capacitance of IGBT 36 form a voltage ramp-type arc suppression circuit which is suitable for light loads and/or small contact separation. This capability is used when wiper 16, having moved away from contact 20, makes contact with contact 18, at which point load current begins to flow from battery 14 through contact 18, wiper 16, load 12 and back to the battery. Capacitor 30, which had previously been fully charged, discharges through contact 18, wiper 16, and diode 32.

Diode 32 serves two functions in the circuit shown. It protects the gate-emitter portion of IGBT 36 from destructive reverse bias, and it also allows capacitor 30 to discharge very quickly. If wiper 16 bounces after initially contacting contact 18, load current will continue to flow from battery 14, but through capacitor 30, resistor 34, and the natural capacitance of the gate-to-emitter portion of semiconductor device 36. Resistor 34 is chosen to be small enough that the voltage drop across it for light loads is about 1 volt. As load current flows through capacitor 30 and the gate-to-emitter capacitance of IGBT 36, the voltage across the contacts 18–20 is limited and therefore no arc develops.

Figure 2:
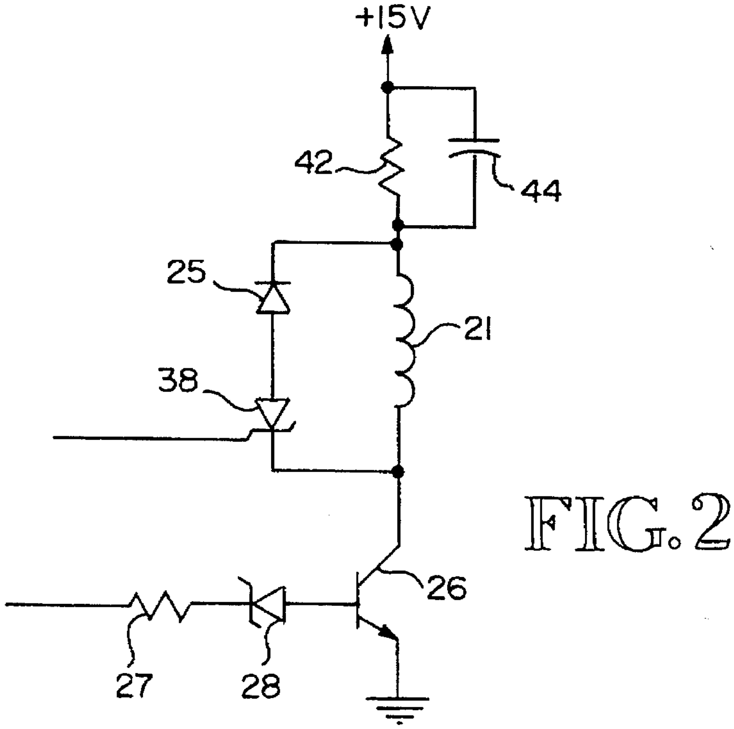
FIG. 2 is a diagram showing a portion of the circuit of FIG. 1 in more detail.

Referring again to FIG. 1, capacitor 30, diode 32, resistor 34 and IGBT 36 form an arc suppression circuit suitable for heavy loads and/or large contact separation, such as occurs in the circuit of FIG. 1 when coil 21 in FIG. 2 is de-energized, and wiper arm 16 is moved back toward contact 20 from contact 18. Thus, the circuit of FIG. 1 is able to protect against arcing between contacts 18 and 20 both when wiper 16 moves away from its normal position against contact 20 to contact 18 and also when wiper 16 thereafter moves back to contact 20.

The movement of wiper arm 16 back toward contact 20 might be initiated, for instance, in the particular embodiment shown when the circuit breaker for the transmission line has been opened and the out-of-tolerance current flowing in the power line has been interrupted, such that the trip coil (load 12 in FIG. 1) for the breaker need no longer be energized. This action is initiated by a signal generated within the protective relay which in effect de-asserts transistor 26 (FIG. 2), such that transistor 26 turns off, thereby blocking current into coil 21 of the Omron G6R-1 circuit. When the coil current is interrupted, flyback diode 25 begins to conduct, preventing destruction of transistor 26 by high voltage.

The zener diode 38 in parallel with coil 21 in the output contact circuit hastens the decay of circulating current in the coil 21, which was initiated when transistor 26 began conducting. This produces a faster action of wiper arm 16, i.e. wiper 16 separates from contact 18 and moves back to contact 20 in a shorter amount of time. This is important, since IGBT 36 conducts and dissipates power when wiper arm 16 is between contacts 18 and 20.

As wiper arm 16 separates from contact 18, current from battery 14 flows through capacitor 30, resistor 34 and the IGBT gate-emitter junction to the load. Current continues to flow until there is enough charge accumulated on the gate portion 40 of the IGBT that the IGBT begins to conduct. Once this threshold gate charge is reached, the IGBT remains in an "on" condition, without the need for continuous gate drive. Once the IGBT turns on, the current path through the IGBT will be through the collector-emitter junction to the load 12. A specific voltage drop equal to the voltage drop across capacitor 30 plus the voltage drop across the gate-emitter portion of IGBT 36 is thus maintained along this current path so that any arc which may initially develop between contact 18 and wiper arm 16 is extinguished by the inherent arc extinction characteristics of the contacts.

Capacitor 30 is important to the operation of the arc suppression circuit of the present invention. There is normally a collector-to-gate stray capacitance in semiconductor devices, referred to as the Miller capacitance, through which, in the embodiment shown, a small displacement current can flow from battery 14 to the gate portion of IGBT 36. The IGBT Miller capacitance and the IGBT gate-to-emitter capacitance form a capacitive voltage divider in the circuit of FIG. 1. Capacitor 30 was added across the IGBT collector-to-gate junction, effectively in parallel with the Miller capacitance, to reduce the voltage rise necessary at the collector of IGBT 36 to provide the charge at the IGBT gate 40 sufficient to turn the IGBT on. A 2 nanoferrad capacitor results in sufficient charge delivered to gate 40 to turn the IGBT on with a collector-to-gate voltage rise of about 5 volts.

The IGBT is thus maintained, through this feedback arrangement, in just the right state of conduction to keep the voltage across the Miller capacitance at the required level to maintain the IGBT in conduction. The circuit basically goes into balance.

The gate voltage necessary to place the IGBT in the proper conduction state for the maximum expected load current can be determined from the IGBT data sheet. That gate voltage is then added to the voltage across capacitor 30 to determine the rating requirement for the contacts.

For example, for the above IGBT, if the contacts are to be used to interrupt 10 amps, the IGBT data sheet indicates that approximately 6 volts on the gate-to-emitter junction of the IGBT is necessary to place the device in conduction. Also from the same IGBT data sheet, one can determine that about 10nC of charge must be delivered to IGBT gate 40 to bring it to 6 V. This 10 nC must pass through capacitor 30, resulting in capacitor 30 charging to about 5 V. Adding the voltage across capacitor 30 to the voltage at the IGBT gate 40, it can be seen that a circuit rated to switch 10 amps at 11 V is required. The Omron circuit mentioned above is rated to switch 10 amps at 24 V and thus is satisfactory.

Resistor 34 is connected between capacitor 30 and gate 40 of the IGBT to minimize, if not eliminate, device oscillations caused by the addition of capacitor 30 across the device Miller capacitance. This has the effect of slowing to some extent the turn off/turn on response of the IGBT.

When wiper arm 16 reaches contact 20, there is no longer any need for the arc suppression circuit, since the contacts have again reached maximum separation. When wiper arm 16 comes into contact with contact 20, the charge on gate 40 of the IGBT is carried away very rapidly through resistor 34, wiper arm 16, and back to the emitter of IGBT 36. This turns IGBT 36 off. Thus, IGBT 36 is only conducting while wiper arm 16 is between contacts 18 and 20, substantially reducing the power dissipated by the IGBT.

When wiper arm 16 comes in contact with contact 20, capacitor 30 is again charged very rapidly so that subsequent bounces of wiper arm 16 on contact 20 do not result in IGBT 36 turning on.

With wiper arm 16 on contact 20, the gate-emitter junction of IGBT 36 is effectively shorted, preventing IGBT 36 turning on because of voltage transients across the open contacts.

After IGBT 36 turns off, load 12 begins to look like a current source if it is inductive. Metal oxide varistor 22 allows the voltage across it to go to approximately 250–300 volts, at which point it begins to conduct. MOV 22 in operation forces the current in an inductive load to ramp down to zero. When the load current returns to zero, with wiper 16 against contact 20, the circuit is back to its initial condition. Since IGBT 36 turns off when the wiper 16 reaches its fully open position against contact 20, the energy in the circuit is substantially dissipated in the MOV 22, with some energy being dissipated in the IGBT during the time wiper arm 16 is moving from contact 18 to contact 20. This is a substantial improvement over similar suppression circuit devices when used with inductive loads.

With wiper arm 16 against contact 20, the magnifying effects of IGBT 36 with respect to capacitor 30 are not present. Thus the total capacitance presented to the load while the contact is open is limited to the value of capacitor 30 plus any stray capacitance associated with the other devices. This is a substantial improvement over other similar arc suppression devices.

The above explanation with respect to FIGS. 1 and 2 was for a circuit configuration where wiper arm 16 is in a "normally open" position, i.e. against contact 20. The circuit of FIGS. 1 and 2, however, is also effective when wiper arm 16 is in a "normally closed" position, i.e. against contact 18. In the normally closed configuration, when there is no current flowing in relay coil 21 (FIG. 2), wiper arm 16 is positioned against contact 18. When current begins to flow in relay coil 21, such as under the conditions discussed above when there is an out-of-tolerance current level on the power line, wiper arm 16 moves away from contact 18 and eventually comes into contact with contact 20.

The time during which wiper arm 16 is moving from contact 18 to contact 20 is important in this configuration as well, because it is during this time that the IGBT 36 is conducting. In this case, however, wiper arm 16 is moving from contact 18 to contact 20 when relay coil 21 is energized. The goal is to reduce the time that wiper arm 16 is moving after transistor 26 turns on. This is accomplished by capacitor 44 (FIG. 2), which provides a momentary overvoltage to relay coil 21, causing current and magnetic flux to build up in coil 21 faster than would be otherwise possible. As capacitor 44 charges, the overvoltage decreases, preventing the relay from being damaged by a continuous high level of overvoltage.

Resistor 42 eliminates the DC blocking capability of capacitor 44, thereby allowing the relay coil to be energized for relatively long periods of time.

Hence, with the circuit of the present invention, it does not matter whether the contacts being protected are configured to be in a normally open or a normally closed position. Further, the device which controls the operation of transistor 26, such as a microprocessor, need not know how the circuit is configured. Transistor 26 is turned on when a particular predetermined power line condition occurs, and turns off when that condition is corrected.

Hence, an arc suppression and extinction circuit has been described which utilizes a particular semiconductor device (an IGBT) and additional capacitance in parallel with the device's inherent Miller capacitance to rapidly shunt current away from the opening contacts, preventing an arc from forming for light loads and/or small contact separations, and allowing the inherent characteristics of the contacts to extinguish the arc for heavy loads and/or large contact separations. In addition, the circuit is arranged so as to minimize the energy dissipated in the semiconductor device itself, to minimize the capacitance presented by the open contacts, and to minimize the effect of load variations on the interrupt time of the contacts.

Although a preferred embodiment of the invention has been disclosed herein for illustration, it should be understood that various changes, modifications and substitutions may be incorporated in such an embodiment without departing from the spirit of the invention which is defined by the claims which follow:

I claim:

1. A circuit capable of suppression of arcing across electrical switching contacts, which comprise first and second switch contacts and a movable arm which moves between the first and second switch contacts, the circuit comprising:

an insulated gate bipolar transistor (IGBT), comprising a Darlington combination of a field effect transistor and a bipolar junction transistor, connected across said switching contacts;

a capacitor connected at one end to a collector portion of the IGBT and said first switch contact and connected at the other end to a gate portion of the IGBT and said second switch contact, wherein the capacitor adds to the stray capacitance of the IGBT so that the combined capacitance is such that in response to a current therethrough, the resulting voltage across the combined capacitance produces a large enough charge at the gate portion of the IGBT to turn the IGBT on, which action in turn limits the voltage across the capacitance to such a value which is just sufficient to maintain the IGBT in conduction, wherein the voltage across the IGBT is sufficiently limited that arcing across the contacts is prevented;

means connecting said first switch contact and said movable arm to a voltage source and a load in such a way that current flows through the switching contacts when said movable arm is in a closed position against said first switch contact;

means connecting said movable arm to an emitter portion of the IGBT such that when said movable arm is in an open position against said second switch contact, any charge which is present on the gate-to-emitter junction of the IGBT is discharged through said second switch contact and the movable arm; and means connected between said first switch contact and said movable arm for preventing current therethrough until a specified voltage is reached thereacross, which occurs when said movable arm contacts said second switch contact and for dissipating current in the circuit after the IGBT has turned off, thereby preventing damage to the IGBT.

2. The circuit of claim 1, including a resistor connected between said capacitor and the gate portion of the IGBT.

3. The circuit of claim 2, including a diode connected from a junction between the resistor and the capacitor to the emitter portion of the IGBT.

4. The circuit of claim 1, wherein said preventing means is a metal oxide varistor, and the specified voltage is at least approximately 300 volts.

* * * * *